UNITED STATES PATENT OFFICE.

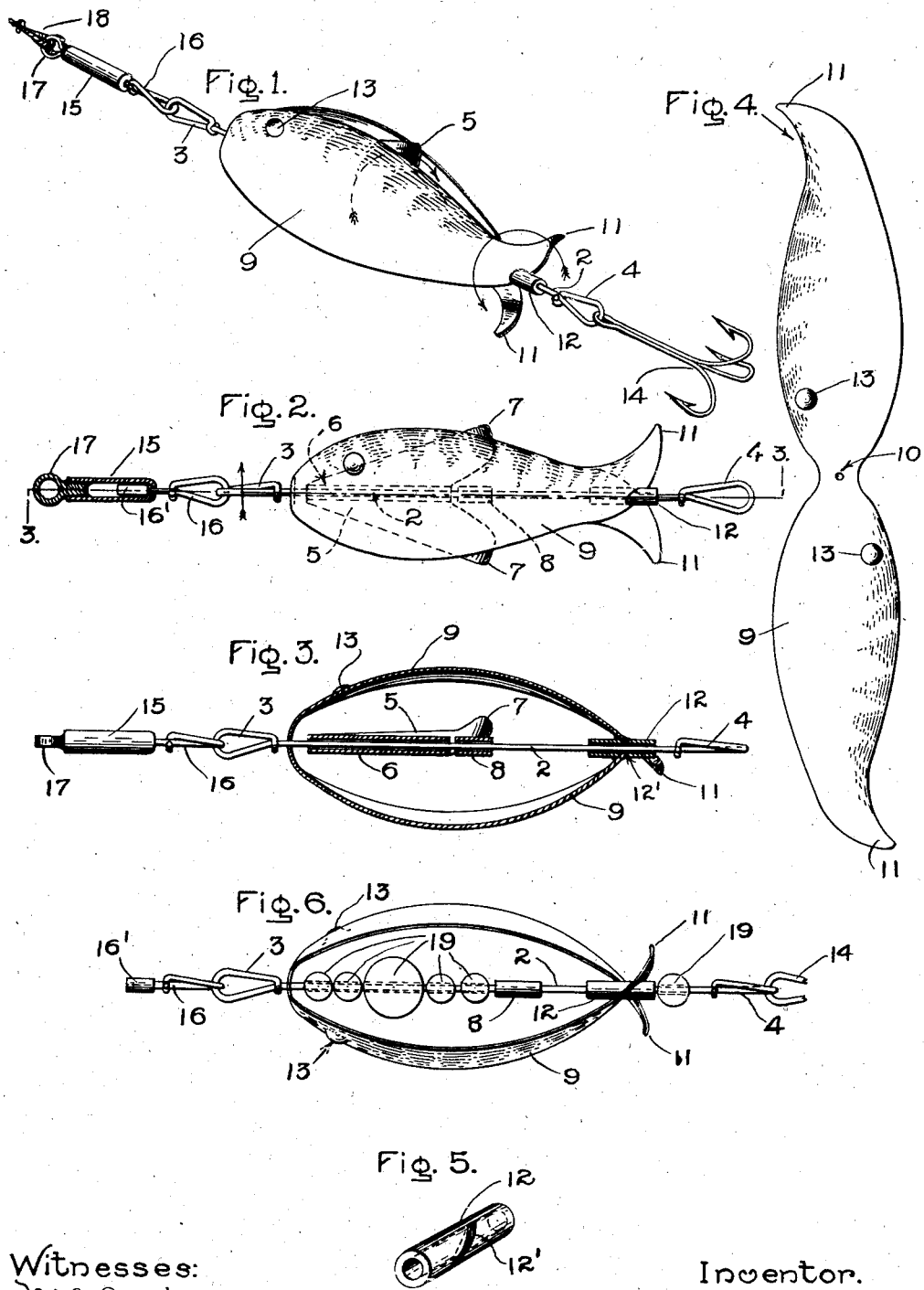

WILLIAM D. CHAPMAN, OF THERESA, NEW YORK, ASSIGNOR TO FRED J. SHARP AND CHARLES J. SMITH, BOTH OF WATERTOWN, NEW YORK.

TROLLING ARTIFICIAL BAIT.

No. 839,917.

Specification of Letters Patent.

Patented Jan. 1, 1907.

Application filed September 29, 1906. Serial No. 336,699.

*To all whom it may concern:*

Be it known that I, WILLIAM D. CHAPMAN, a citizen of the United States, residing at Theresa, in the county of Jefferson and State of New York, have invented certain new and useful Improvements in Trolling Artificial Bait, of which the following is a specification.

This invention relates to improvements in artificial bait designed for use in catching fish, and the invention relates particularly to a trolling device which is so constructed that when operated the bait or lure is given a constant spinning or whirling motion.

The object of the invention is to provide a trolling device for pickerel, bass, and other fish which is simple, durable, effective, and inexpensive and wherein the construction, arrangement, and operation of the device is such that it affords a perpetual bait or lure which attracts the fish, thus enabling the person using the same to catch fish without being required to supply or employ live or other forms of perishable bait.

An important feature of the invention consists in providing a series of simple members, which are peculiarly formed and then arranged so that when the device is submerged and drawn through the water, as by trolling, the said members are caused to spin or whirl and by that means attract and lure the fish.

Another feature of the invention consists in forming and applying one of the spinning members in such manner that when the device is moved through the water it has the appearance and shape of a small fish attired in a bright and shiny coating.

The invention further consists in the constructions and in combinations hereinafter described, and particularly pointed out in the claims.

The invention will be more readily understood by reference to the accompanying drawings, forming a part of this specification, in which similar characters of reference indicate corresponding parts in all of the figures, and in which—

Figure 1 is a perspective view of my complete trolling device, showing the prominent features of the same. Fig. 2 is a side elevation of the device, showing the large outer whirling member, also showing in section a swivel member attached to one end of the bait. Fig. 3 is a longitudinal sectional view substantially on the line 3 3 of Fig. 2, showing the construction and arrangement of the principal parts of the device, also showing manner of connecting the swivel. Fig. 4 is an enlarged detail view of the larger spinning part, showing its form before folding. Fig. 5 is an enlarged detail view of a sleeve forming a part of the spinning parts of the device. Fig. 6 is a view of a modified form of the device, showing but one spinning member, also showing a series of beads substituted for the smaller spinning part.

In the drawings, 2 represents a central rod or stock, which is preferably made of stiff wire of suitable gage, the opposite ends of which are formed into loops 3 and 4, which are substantially alike in size and shape. Upon the rod or shaft 2, near the loop 3, is disposed a twin spinner 5, preferably made from thin sheet metal in the form shown in dotted lines in Fig. 2. The spinner 5 is provided with a central tubular part 6, to which the body is secured either by soldering or brazing. The rod or shaft 2 passes through the tube 6, the bore of the latter being somewhat larger than the diameter of the rod, so as to permit the spinner to revolve freely thereon. The tips of the rearwardly-projecting wings 7 of spinner 5 are bent or curved in opposite directions, so as to effect the revolving screw-like of this part when the device is drawn through the water. In action spinner 5 resembles the common screw-propeller employed in driving water-craft. The part 5 is held from rearward movement along the wire 2 by a sleeve 8, which is rigidly secured to rod or shaft 2 by soldering or by other suitable means. The spinner 5 if constructed as shown in the drawings will turn to the left when rotated by drawing it through the water.

9 represents an outer whirling or spinning member mounted on rod 2 between loops 3 and 4, and consists of a strip or sheet of thin sheet metal, preferably brass or German silver of a thin gage, which is cut and then bent or folded and applied to the device in the manner shown in Figs. 1, 2, 3, and 6. The part 9 is preferably stamped from sheet metal in one piece in the form shown in Fig. 4. A small hole 10 is punched or bored through the central portion of the strip 9, and when folded the hole 10 is employed for mounting the part upon the rod or stock 2. The folding of the strip 9 in the manner shown gives the part a form resembling a fish when viewed from its sides, the hole 10 representing the mouth and the points 11 the tail of the fish. In order to securely hold the ends 11 of part 9 in place and also provide a bearing upon the wire 2 for the tail of this revolving part, a small tube or sleeve 12 is provided, the opposite sides of which are slitted or cut with a saw or otherwise to a slight depth at 12' to receive the thin edges of the points 11, which are then held in the slits of sleeve 12 by means of solder or spelter. This completes the making of the fish-shaped spinner 9, except that a small boss 13 is formed on each side of the head to represent the fish's eyes.

In constructing and assembling my trolling device the loop 4 of wire 2 is first formed, then the wire is inserted through the tube or sleeve 12, then through sleeve or stop 8, the tubular part 6 of the spinner 5, and lastly through hole 10 of the part 9. After these operations are completed the loop 3 is formed, and thereafter all of the parts named will be held in operative position. Loop 4 will act as a stop for part 9 and should be so adjusted that it will hold part 9 away or free from the forward end of spinner 5, so as not to hinder said part from revolving freely. The sides of the member 9 are slightly convexed or ovaled, the same as the body of a fish, and the tail points 11 are curved or bent in such manner that the part will revolve by the force applied in drawing the device through the water, the same as described for spinner 5; but in this instance the member 9 is made to rotate to the right or in the opposite direction to that of the part 5. In folding member 9 the sides are disposed far enough apart to allow the spinner 5 to revolve or spin freely between them. The spinning or whirling parts 5 and 9 of my trolling device are preferably finished with a bright surface on all sides, and certain parts may be painted in brilliant colors in order to make them more attractive and alluring to the fish.

A hook or any desired number of hooks 14 may be attached to the loop 4 of rod 2 for use in catching and holding the fish which have been lured by the bright spinning parts of the device.

Long experience and use of fishing devices of the trolling class have shown the need of a yielding part in the nature of a swivel or like contrivance which should intervene between the line and the lure and hooks for the purpose of preventing the twisting or tangling of the line while trolling. There are many varieties of swivels which have long been in use for this purpose; but most of them are more or less complicated and expensive. For these reasons I have devised a simple swivel and attach it to loop 3 of wire 2. It consists of a small tube 15, a looped part 16, and an eye 17. The loop 16 is provided with a short stem 16', the inner end of which is upset or formed into a small head and then inserted into tube 15 and the end of the tube contracted by spinning or otherwise to a diameter smaller than the head of the stem, thus forming a very simple and serviceable swivel. The eye 17 is also provided with a short stem, which is soldered or sweat into the other end of tube 15, so that it will move or act with said tube. A line 18 is secured to the eye 17.

In practice the trolling device is let down in the water and then drawn along by the line 18. As soon as the device is started the spinning members 5 and 9 begin to rotate in opposite directions upon the shaft or wire 2. The effect of the double spinners in motion as described is to produce a shiny or luminous, apparently animate, bait or lure having the appearance of a small fish, which certain of the larger fish, such as bass and pickerel, relish as food and for which they are constantly seeking. As soon as they see this brilliant object whirling and moving through the water they are attracted by it, and if they can get near enough they snap at the lure and are caught by the hooks 14.

Fig. 6 represents a modified form of my trolling device from which I have omitted the twin spinner 5 and have substituted in its place a series of beads or globe-like parts 19. The beads are loosely mounted on the central rod 2, and may be made of any suitable material, and they may be all of the same or each of a different color, according to taste. In all other respects the device shown in Fig. 6 is constructed and operates the same as the device shown and described in the other figures.

It is obvious that changes or modifications may be made in some of the parts without departing from the spirit of my invention, and I therefore do not restrict myself to the precise construction and arrangement of the same as shown and described herein.

Having thus described my invention, what I claim as new, and desire to secure by Letters Patent, is—

1. A trolling device, comprising a central rod or shaft having integral loops formed on each end thereof, a left-hand spinning member operatively mounted near the forward end of said rod or shaft, a sleeve or stop secured to said rod or shaft adapted to limit the longitudinal movement of said spinning member, a right-hand spinning member mounted on said rod or shaft adapted to spin or whirl around said first-named member, and a swivel attached to said rod or shaft, substantially as described.

2. A trolling artificial bait, comprising a central rod or shaft, a pair of spinning members concentrically arranged upon said rod or shaft adapted to rotate or spin in opposite directions when the device is drawn through water, and stops to limit the rearward movement of both of said spinning members, substantially as described.

In testimony whereof I affix my signature in presence of two witnesses.

WILLIAM D. CHAPMAN.

Witnesses:
    BURT E. JARVIS,
    GEO. E. YOST.